United States Patent [19]

Ozaki

[11] Patent Number: 4,587,450
[45] Date of Patent: May 6, 1986

[54] SYNCHRONOUS MOTOR ROTOR

[75] Inventor: Osamu Ozaki, Komaki, Japan

[73] Assignee: Sanyei Corporation, Japan

[21] Appl. No.: 568,585

[22] Filed: Jan. 6, 1984

[51] Int. Cl.$^4$ .......................................... H02K 21/12
[52] U.S. Cl. .................................... 310/156; 310/42; 310/43; 310/83; 310/261; 29/598; 335/303
[58] Field of Search ................ 310/156, 153, 40 MM, 310/43, 83, 162, 163, 164, 42, 261, 264, 265; 335/303; 29/598; 324/146

[56] References Cited

U.S. PATENT DOCUMENTS

| 2,080,018 | 5/1937 | Tognola | 310/156 |
| 2,488,729 | 11/1949 | Kooyman | 310/156 |
| 3,728,786 | 4/1973 | Lucas | 310/156 |
| 3,872,334 | 3/1975 | Loubier | 310/156 |
| 3,943,693 | 3/1976 | Ono | 310/156 |
| 3,943,698 | 3/1976 | Ono | 310/156 |
| 3,953,752 | 4/1976 | Bannon | 310/156 |

FOREIGN PATENT DOCUMENTS

| 1080677 | 4/1960 | Fed. Rep. of Germany | 310/156 |
| 1118335 | 11/1961 | Fed. Rep. of Germany | 310/156 |
| 0113670 | 5/1967 | Netherlands | 310/156 |
| 0200142 | 12/1936 | Switzerland | 335/303 |
| 0210270 | 9/1940 | Switzerland | 310/156 |
| 0774195 | 5/1957 | United Kingdom | 310/156 |

Primary Examiner—R. Skudy
Attorney, Agent, or Firm—Ostrolenk, Faber, Gerb & Soffen

[57] ABSTRACT

A rotor for a synchronous motor including a bar magnet with a cross-section that is circular, square, square with beveled corners, etc., is inside the hollow central part of a plastic resin support which has been molded over the magnet, and which has windows formed in the support providing access to the magnet. The motor shaft projects from the ends of the support, and may either be molded with the support or may be inserted into the ends of the support, and a drive gear may be formed in one end of the shaft. The invention avoids the need for forming holes in the magnet for the shaft.

12 Claims, 12 Drawing Figures

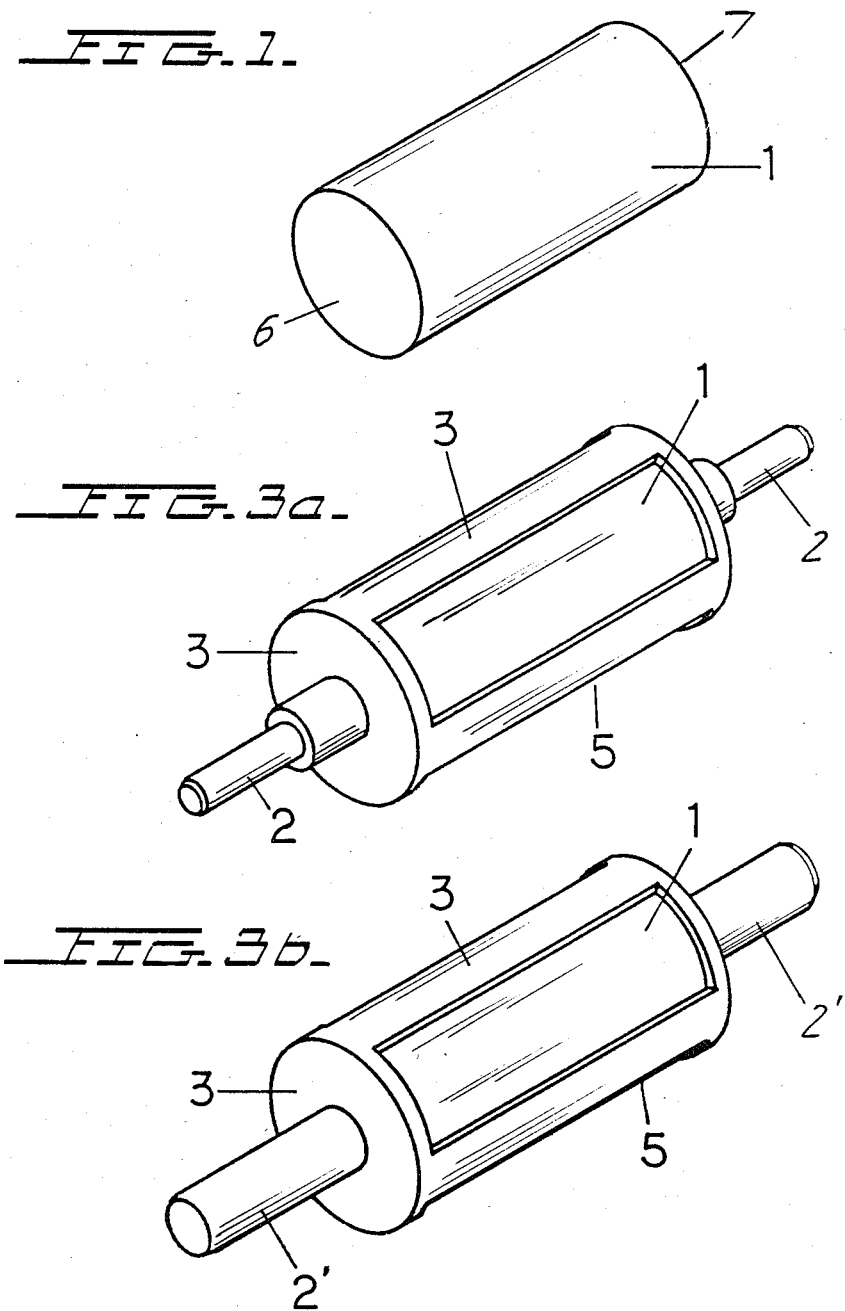

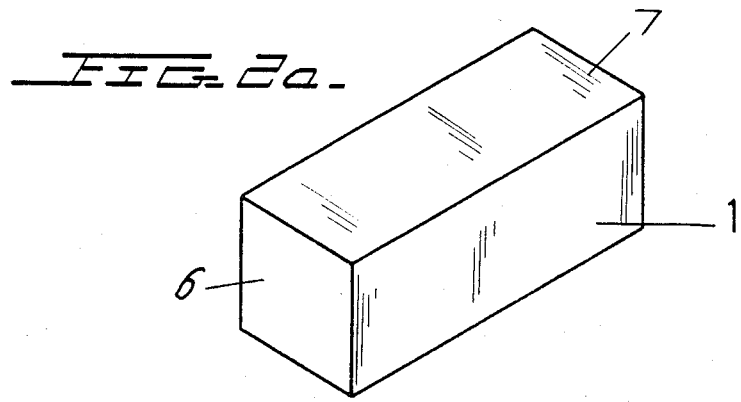
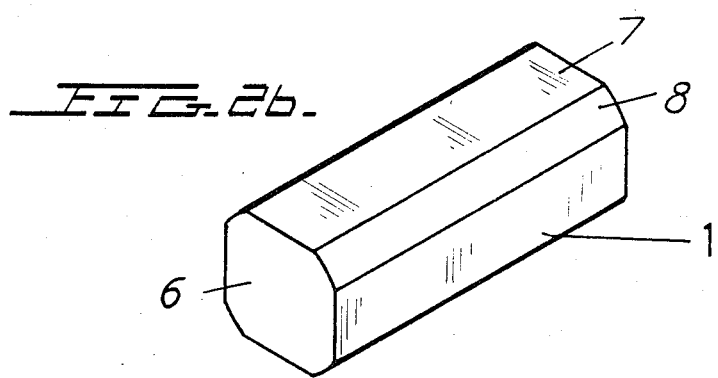
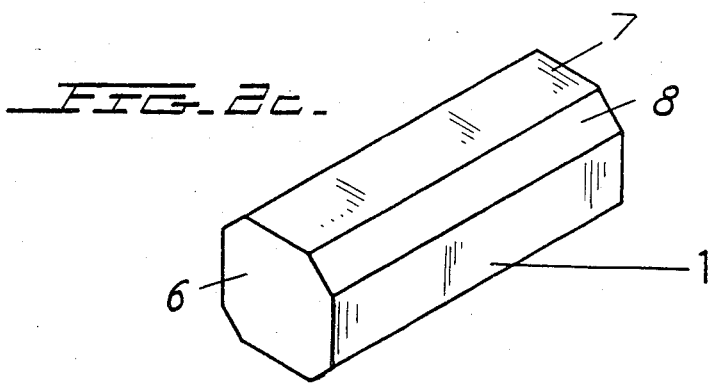

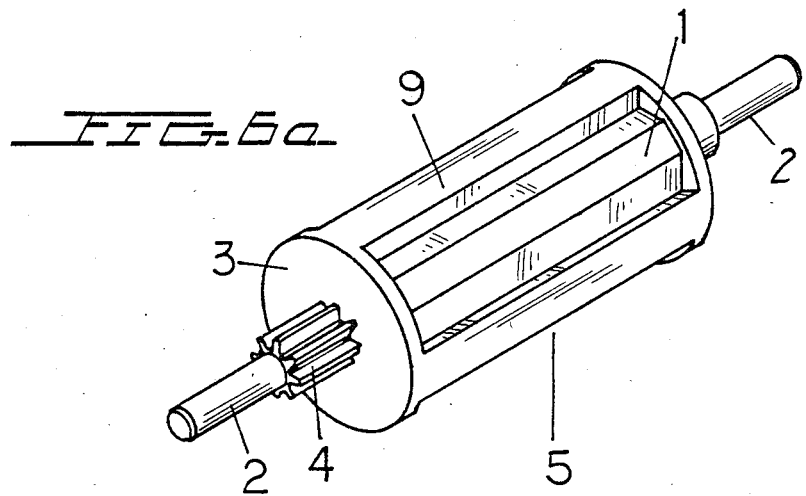
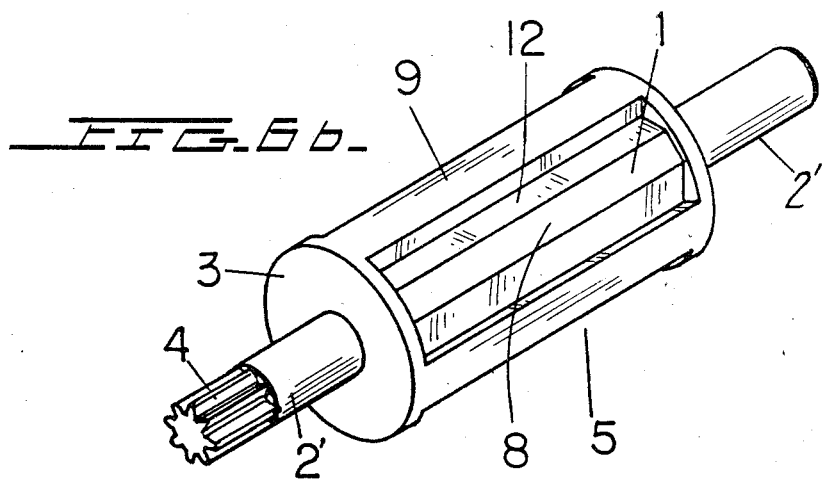

SYNCHRONOUS MOTOR ROTOR

BACKGROUND OF THE INVENTION

1. Field of the Invention

The invention is related to a rotor used in a small motor, particularly a synchronous motor, and relates to the shape of a magnet used in the rotor.

2. Description of the Prior Art

The conventional magnets used in synchronous motor rotors have holes in them for connecting two motor shafts. The shafts are pressed or bonded into the holes.

One method of forming these holes in the magnets is to form them in the pressure-powder molding process by which the magnets are manufactured. Specifically, the mold in which the magnet is formed is shaped to create the necessary holes in the magnets. For isotropic magnets, this molding process can be used to make the holes, because the magnets can be magnetized after the pressure-powder molding process is completed. But for aeolotropic or anisotropic magnets, the hexagonal plate-shaped ferrite crystals in the magnet must be aligned in a certain direction by preliminary magnetization during the pressure-powder molding process. If the magnets are small and if the difference between the outer and inner diameters, i.e. the total wall thickness, is large, the pressure-powder molding process requires a long compression stroke. A long stroke makes it difficult to apply uniform pressure throughout the magnet, so that the ferrite crystals of an aeolotropic magnet cannot be properly aligned. Since aeolotropic magnets yield greater rotational torque than isotropic magnets of the same shape, aeolotropic magnets are preferred for use in motors. Because of the difficulty of forming the holes while maintaining alignment of the ferrite crystals, however, it has not been possible to obtain an aeolotropic magnet with an appropriately strong magnetic field in the radial direction with respect to the axis of the motor shaft.

The alternative method of cutting holes in a magnet with a tool, such as a drill, is usually difficult, except for magnets formed by grinding. Therefore, holes are almost never formed by cutting.

As a result of the above-described difficulties, small magnets having appropriately strong magnetic fields and having outer diameters of approximately 15 mm., inner diameters of approximately 5 mm., and overall lengths of approximately 30 mm., for example, have not been available. Consequently, rotors having either weak magnetic fields or incorporating extremely expensive magnets have been used. It would be desirable to provide rotors incorporating small, strong magnets but without the necessity of molding or cutting holes in the magnets.

SUMMARY OF THE INVENTION

The primary object of this invention is to provide a rotor for use in a synchronous motor which can be manufactured without the cost and difficulty of forming holes in a magnet.

A further object of the invention is to provide such a rotor incorporating a small, strong magnet in a structure which can be mass produced at low cost.

Another object of the invention is to incorporate the magnet in a molded plastic body of a motor rotor.

These and other objects of the invention are achieved by providing a magnet with flat end surfaces and the magnet is mounted in the hollow central portion of a support. The two opposite ends of the support form the motor shaft for mounting to a motor.

In one embodiment, the flat end surfaces of the magnet are parallel and the peripheral side surface which joins the flat end surfaces is perpendicular to the flat end surfaces. In this embodiment, the cross-section of the magnet through the peripheral or side surface may be uniformly circular, uniformly square or may be generally square with beveled corners, for example.

In a preferred embodiment, the central portion of the support is formed as an outer covering of synthetic resin formed and particularly molded on the magnet. To permit access to the magnet within, the support has one or more windows in its periphery at which the magnet is exposed. The motor shaft may be formed of the same material and may be integrally formed as a single piece with the outer covering. Alternatively, the motor shaft may be formed from a different material than the outer covering and may be injection molded or pressed into the outer covering.

In a further embodiment, the drive gear is formed on the motor shaft, and may be integrally molded as a single piece with the outer covering.

Other objects, features and advantages of the invention will be apparent from the following description, together with the accompanying drawings.

BRIEF DESCRIPTION OF THE DRAWINGS

FIG. 1 is a diagonal perspective view of a cylindrical magnet with flat end surfaces used in the invention.

FIG. 2A is a diagonal perspective view of a columnar magnet with square cross-section for use in the invention.

FIG. 2B is a diagonal perspective view of the square columnar magnet of FIG. 2A, having its corners beveled by R processing.

FIG. 2C is a diagonal perspective view of the square columnar magnet of FIG. 2A, having its corners beveled by C-bevel processing.

FIG. 3A is a diagonal perspective view showing the magnet of FIG. 1 mounted in an outer covering of the invention with the motor shaft insert molded or pressure molded into the outer covering.

FIG. 3B is a diagonal perspective view showing the magnet of FIG. 1 mounted in the outer covering with the motor shaft formed integrally as a single piece with the outer covering.

FIG. 6A is a diagonal perspective view showing the magnet of FIG. 2C mounted in an outer covering with which a drive gear has been integrally formed and into which the motor shaft has been insert molded or pressed.

FIG. 6B is a diagonal perspective view showing the magnet of FIG. 2C mounted in an outer covering formed integrally as a single piece with the motor shaft including the drive gear.

DETAILED DESCRIPTION OF THE PREFERRED EMBODIMENTS

Figure 4A:
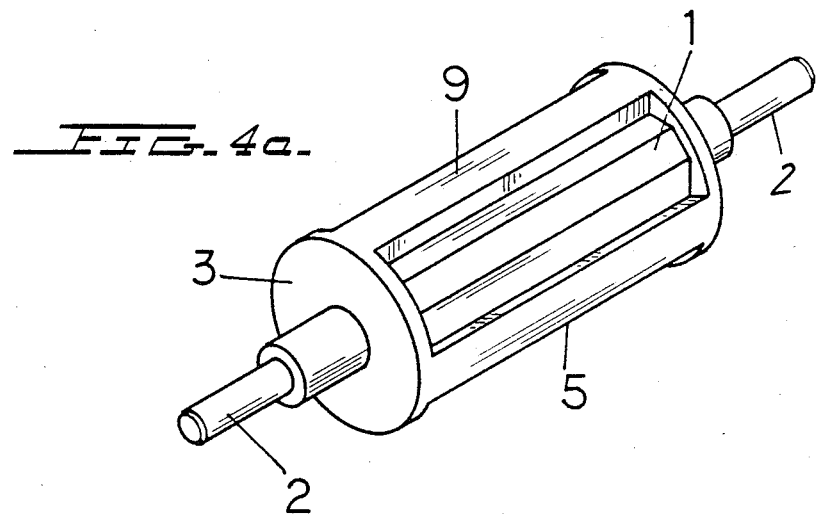
FIG. 4A is a diagonal perspective view showing the magnet of FIG. 2C mounted in the outer covering of the invention with the motor shaft insert molded or pressure molded into the outer covering.

FIGS. 1 and 2A–2C show the shapes of the magnet 1 to be used in the invention. FIGS. 3–6 show several embodiments of the synchronous motor rotor 5 of the invention in which magnet 1 is mounted. Like reference numerals for corresponding parts of the invention have been used in all of the drawings.

FIG. 1 shows magnet 1 having a cylindrical shape with a circular cross-section. Magnet 1 has flat end surfaces 6, 7 which are parallel to each other and perpendicular to the circular side or peripheral surface. Because of its regular shape and uniform cross-section and because it lacks any holes for connecting to a shaft or other support, magnet 1 can be readily manufactured as an aeolotropic magnet.

FIGS. 2A–2C show three alternative embodiments of magnet 1 which, like magnet 1 in FIG. 1, have parallel flat end surfaces 6, 7 joined by a side or peripheral surface perpendicular to the flat end surfaces. In FIG. 2A, however, the cross-section of the side surface along each plane parallel to the end surfaces is a uniform square. In FIG. 2B, the cross-section is generally square, but the corners of the square are beveled round slightly by R processing around the radius measured from the center of the magnet. Similarly, in FIG. 2C, the corners of the generally square cross-section magnet are beveled first by C-bevel processing. In both FIGS. 2B and 2C, the bevels 8 are formed on all four corners of the generally square columnar magnets 1. Grinding the bevel 8 permits the efficient production of magnets with excellent strength.

FIGS. 3A and 3B show the magnet a of FIG. 1 mounted in two embodiments of the support to form the rotor 5 of the invention. In both of these Figures, part of the side or peripheral surface of magnet 1 is covered by an outer covering 3. In the embodiment shown, outer covering 3 includes a plurality of parallel strips 9 extending along the peripheral side surface of magnet 1 between the flat end surfaces 6, 7. These strips 9 terminate at the end portions 10 and 11 of the support and together they define windows 12 in the support. Note that the entire flat end surfaces 6, 7 of magnet 1 are covered by the end portions 10 and 11 of outer covering 3. This outer covering 3 is connected to motor shaft 2 or 2' which includes two opposite ends, each opposite end extending from one of the flat end surfaces of magnet 1. Therefore, motor shaft 2 or 2' and outer covering 3 together function as a support for magnet 1, with the opposite ends of motor shaft 2 or 2' being rotatably mounted to a motor (not shown) and outer covering 3 forming a central portion of the support having an internal space or opening containing magnet 1.

In the embodiments shown in FIGS. 3A and 3B, outer covering 3 is formed in a single piece by injection molding of a synthetic resin. In the embodiment of FIG. 3A, motor shaft 2 is made of a different material than outer covering 3 and is insert molded or pressure molded into outer covering 3. In FIG. 3B, on the other hand, motor shaft 2' is made of the same material as outer covering 3 and preferably is molded as an integral single piece with outer covering 3.

Figure 4B:
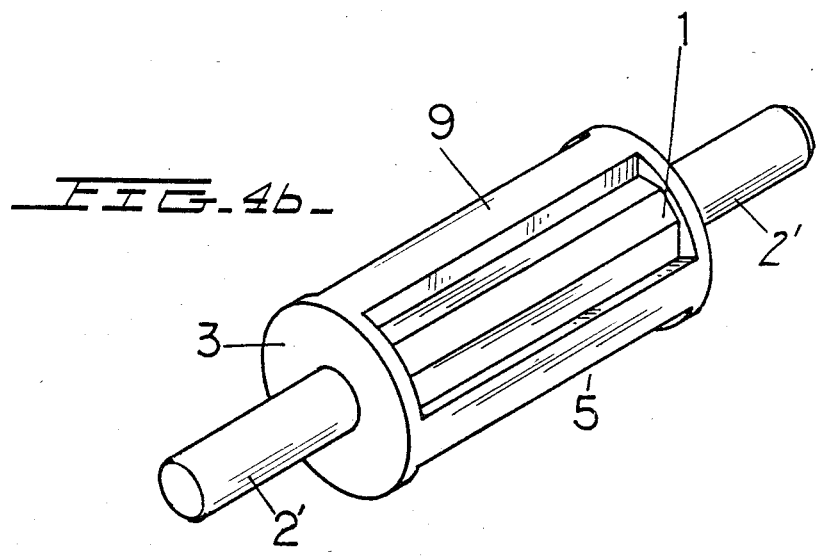
FIG. 4B is a diagonal perspective view showing the magnet of FIG. 2C mounted in the outer covering with the motor shaft formed integrally as a single piece with the outer covering.

FIGS. 4A and 4B show a rotor 5 incorporating magnet 1 of FIG. 2C. As in FIG. 3A, the rotor 5 of FIG. 4A includes outer covering 3 for containing magnet 1 and motor shaft 2 which is insert molded or pressure molded into outer covering 3. As in FIG. 3B, the rotor 5 of FIG. 4B includes outer covering 3 and motor shaft 2' molded of the same material as an integral single piece.

Figure 5A:
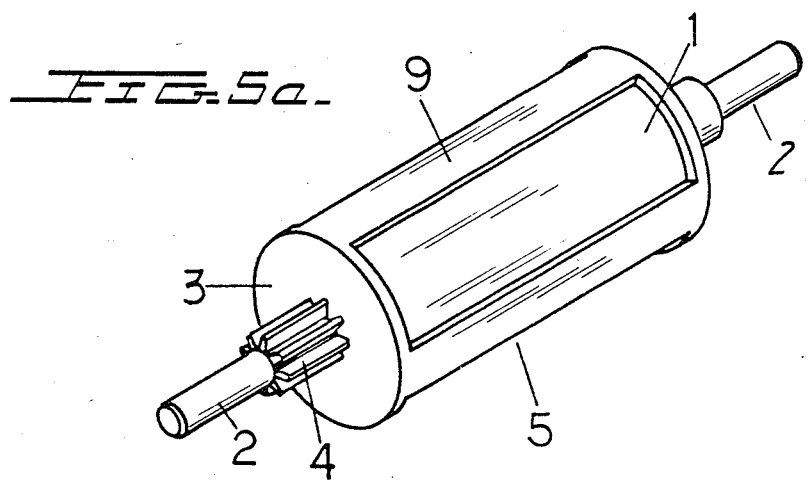
FIG. 5A is a diagonal perspective view showing the magnet of FIG. 1 mounted in an outer covering with which a drive gear has been integrally formed and into which the motor shaft has been insert molded or pressed.
Figure 5B:
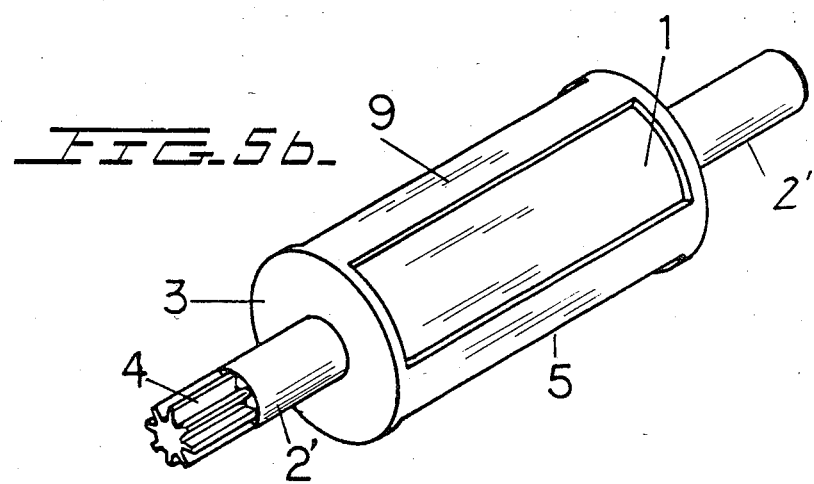
FIG. 5B is a diagonal perspective view showing the magnet of FIG. 1 mounted in an outer covering formed integrally as a single piece with the motor shaft including the drive gear.

Rotors 5 in FIGS. 5A and 5B closely resemble those of FIGS. 3A and 3B, but also include drive gear 4. In the embodiment of FIG. 5A, drive gear 4 is molded with outer covering 3 as an integral single piece by injection molding of synthetic resin. Motor shaft 2 is then insert molded or pressed into drive gear 4 or outer covering 3. In FIG. 5B, on the other hand, outer covering 3, motor shaft 2' and drive gear 4 are all molded as an integral single piece.

FIGS. 6A and 6B show rotors 5 closely resembling that of FIGS. 5A and 5B, but incorporating magnet 1 from FIG. 2C. As in FIG. 5A, FIG. 6A shows drive gear 4 formed as an integral single piece with outer covering 3, while FIG. 6B shows outer covering 3, motor shaft 2' and drive gear 4 all formed as an integral single piece.

Because magnet 1 in each of the embodiments of FIGS. 3–6 is supported by outer covering 3 and motor shaft 2, no holes in the flat end surfaces 6, 7 of magnet 1 are necessary. Consequently, no deviations will be caused in the outer circumference as a result of creating such holes, so that only the overall length of the magnet between flat end surfaces 6, 7 and the outer diameter need be precisely controlled.

In one specific actual embodiment, a regular hexahedron measuring 150 cm.×90 cm.×14 mm. was cut into 24 solid bodies having the square columnar shape shown in FIG. 2A, and measuring 30 mm.×13 mm.×13 mm. These solid bodies were then magnetized to produce magnets for rotors of the invention. In general, magnets of any desired size can be produced in a similar manner. A large regular hexahedron is formed by putting many magnets together into a single piece, which is then cut into smaller magnets of the desired size. As noted above, magnets with excellent characteristics can also be produced by grinding bevels by R processing or C-bevel processing the four corners of the resulting square columnar magnets.

In one preferred embodiment, the synthetic resin used in molding the support of the invention was polyamide resin, Nylon 66, but other engineering plastics may be used, such as polyacetal resins or polycarbonate resins. The use of synthetic resins to perform single-piece molding reduces the weight of the parts of the rotor and reduces the number of parts making up the motor.

Although the present invention has been described in connection with a number of preferred embodiments thereof, many other variations and modifications will now become apparent to those skilled in the art. It is preferred, therefore, that the present invention be limited not by the specific disclosure herein, but only by the appended claims.

What is claimed is:

1. A rotor for a motor comprising: a support, the support having first and second opposite ends for mounting the support within a motor and having a central portion between the first and second opposite ends, the support being rotatable around an axis in relation to the motor, the central portion having an internal opening; and a magnet lacking holes therein for connecting the magnet to the support mounted in the opening in the central portion of the support, the magnet having first and second end surfaces disposed toward the first and second opposite ends of the support, respectively, the support supporting the magnet by abutting the magnet and without requiring holes in the magnet to support it, at least the central portion of the support comprising an outer covering of synthetic resin formed upon the magnet, the outer covering entirely covering the first and second flat end surfaces of the magnet and the outer covering over the side peripheral surface of the magnet having windows defined in it, giving access to the magnet.

2. The rotor of claim 1 in which the first and second end surfaces of the magnet are flat and parallel, the magnet having a side peripheral surface joining the flat end surfaces and perpendicular to the flat end surfaces.

3. The rotor of claim 2 in which the side peripheral surface of the magnet has a circular cross-section.

4. The rotor of claim 2 in which the peripheral side surface of the magnet has a square cross-section.

5. The rotor of claim 2 in which the side peripheral surface of the magnet has a cross-section which is generally square, the corners of the square being beveled.

6. The rotor of claim 1 in which the outer covering covers part of the side peripheral surface of the magnet.

7. The rotor of claim 1 in which the first and second opposite ends of the support comprise respective first and second shaft sections.

8. The rotor of claim 7 in which the first and second shaft sections are integrally formed of synthetic resin together with the central portion of the support.

9. The rotor of claim 7 in which the first and second shaft sections are pressure molded into the central portion of the support.

10. The rotor of claim 7 in which the first and second shaft sections are insert molded into the central portion of the support.

11. The rotor of claim 7 in which the first and second shaft sections are formed of a material different from that which the central portion of the support is formed.

12. The rotor of claim 7 in which at least one of the first and second shaft sections comprises a drive gear.

* * * * *